United States Patent [19]
Excoffon

[11] 3,861,375
[45] Jan. 21, 1975

[54] CYLINDER HEAD FOR A DIESEL ENGINE
[75] Inventor: Jean Excoffon, Villeurbanne, France
[73] Assignee: Automobiles M. Berliet, Lyon, (Rome), France
[22] Filed: Feb. 16, 1972
[21] Appl. No.: 226,721

[52] U.S. Cl. .......................... 123/188 M, 123/193 H
[51] Int. Cl. ............................................. F02f 1/42
[58] Field of Search ............ 123/188 M, 75 B, 75 C, 123/193 H, 30 C, 30.4

[56] References Cited
UNITED STATES PATENTS

| | | | |
|---|---|---|---|
| 3,125,075 | 3/1964 | Wittek | 123/188 M X |
| 3,411,490 | 11/1968 | Akana | 123/75 B |
| 3,590,797 | 7/1971 | Blank | 123/188 M |

FOREIGN PATENTS OR APPLICATIONS

| | | | |
|---|---|---|---|
| 260,527 | 3/1961 | France | 123/188 M |
| 983,059 | 2/1965 | Great Britain | 123/188 M |

*Primary Examiner*—Charles J. Myhre
*Assistant Examiner*—W. Rutledge, Jr.
*Attorney, Agent, or Firm*—Irving M. Weiner

[57] ABSTRACT

A diesel engine cylinder head which covers at least two ajoining cylinders. Each cylinder includes two exhaust valves and two inlet valves arranged about a central bore which receives an injector. An inlet conduit opens on one face of the cylinder head and leads to the two inlet valves. The inlet conduit includes a rectangular section which is common to the two inlet valves of a cylinder, and a longitudinal partition which separates a portion of the inlet valve into two smaller conduits, each of these smaller conduits opening to a different one of the inlet valves in a cylinder. An exhaust conduit opens to a side face of the cylinder head opposite that face at which the inlet conduit opens. The exhaust conduit leads to both exhaust valves in a cylinder, and includes a rectangular section over a length leading to the exhaust valve nearest the side face of the cylinder head at which the exhaust conduit opens, and is generally curved inwardly toward the axis of the cylinder along its length extending from the exhaust valve nearest the side face of the cylinder head at which the exhaust conduit opens to the exhaust valve furthest from the side face of the cylinder head at which the exhaust conduit opens.

3 Claims, 7 Drawing Figures

CYLINDER HEAD FOR A DIESEL ENGINE

The present invention relates to a cylinder head for a diesel engine.

It is known that in a diesel engine, the design of the cylinder head must satisfy contradictory demands, particularly in so far as the admission of air and the escape of burnt gases is concerned. On the one hand it is desirable for the inlet and outlet conduits to offer a minimal resistance to the passage of the gases, and as a result they are made in as wide a section as possible, and of an almost rectilinear shape. On the other hand, to make sure that the cylinder is completely filled and to reduce the time of burning of the explosive mixture, it is desirable to create a turbulence in the gases which is usually obtained by reducing the sections of the conduits in order to increase the speed of flow of the gases and by making the inlet conduits of an incurved shape.

The difficulty of finding a compromise between these contradictory demands is further increased by the requirements of manufacture of the cylinder head, especially in the case of an engine with four valves per cylinder. To position these four valves and the injector, without thereby causing undue complications in the shape of the mold-cores, limits the choice of the shapes of the inlet and exhaust conduits.

The aim of the present invention is to avoid these difficulties by creating a diesel engine cylinder head which offers an improved design, both from the point of view of manufacture and from that of performance. In addition, such a cylinder head is particularly suited to a V-engine.

According to the present invention there is provided a cylinder head for a diesel engine, each cylinder of the engine having two axially spaced inlet and two axially spaced exhaust valves arranged about a central injector receiving bore, in which the head is provided with bores to receive the stems of the inlet and exhaust valves, the axes of the two inlet valve stem bores being disposed in a plane extending perpendicular to a joining plane of the cylinder head and perpendicular to the first side face of the cylinder head at which an inlet conduit opens, the axes of the exhaust valve stem bores being disposed in a plane perpendicular to the second side face of the cylinder head, the inlet conduit being divided within the head by a partition into two smaller conduits each associated with one of the inlet valves of the cyliner, the longer of the two smaller conduits being curved inwardly towards the axis of the cylinder, the exhaust conduit having a substantially rectilinear section over a length leading to a first of the two exhaust valves and thereafter being curved inwardly towards the axis of the cylinder over a length leading to a second of the two exhaust valves.

Preferably, the head is dimensioned to cover two cylinders of the engine, the arrangement of the valves and of the inlet and exhaust conduits being such that the two exhaust conduits open on the same said second side face of the cylinder head, and the two inlet conduits open on the first side face.

Not only does this arrangement permit improved engine performance, but it lends itself particularly well to the manufacture of a V-engine and allows the use of comparatively simple mold-cores.

The invention will be described further, by way of example, with reference to the accompanying drawings, in which.

Figure 2:
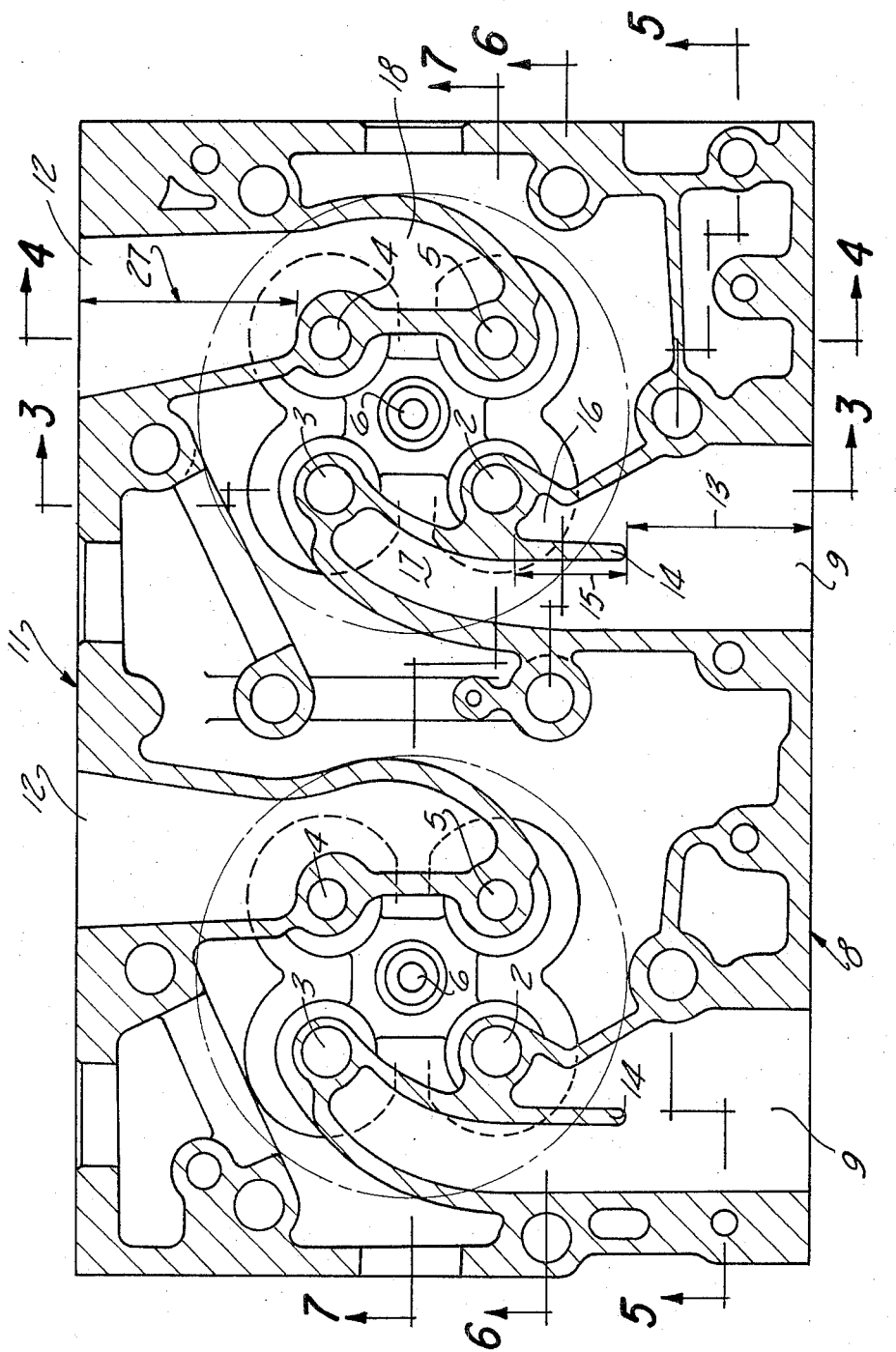
FIG. 2 is a section along the line 2—2 in FIG. 3.
Figure 3:
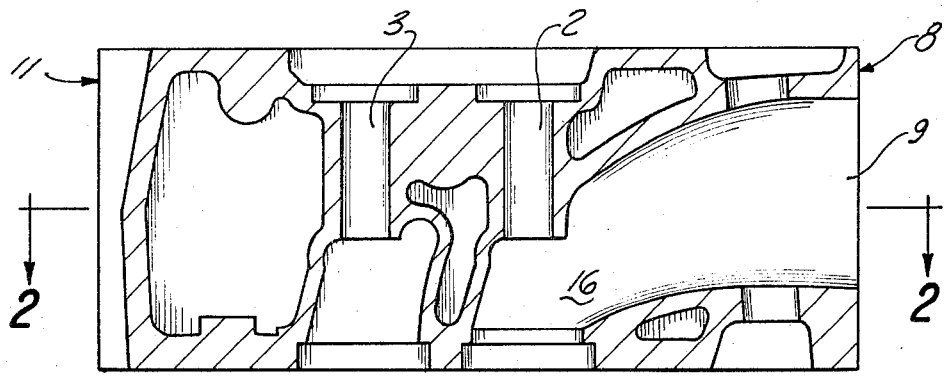
Figure 4:
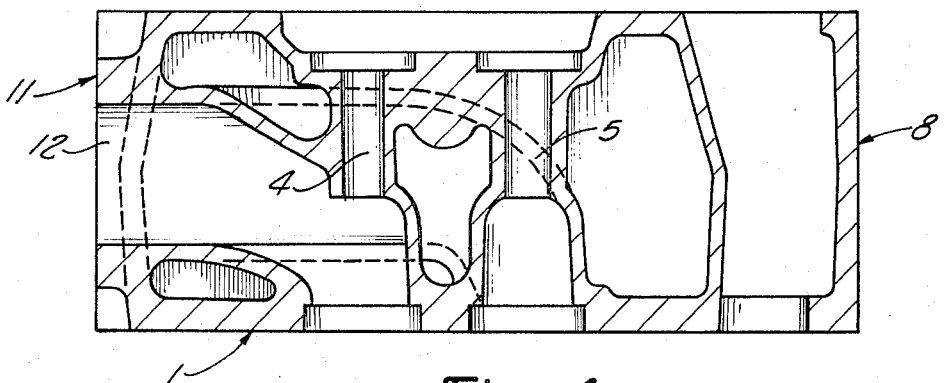

FIGS. 3 to 7 respectively are sections along the lines 3—3, 4—4, 5—5, 6—6, 7—7 in FIG. 2.

The drawings illustrate a diesel engine cylinder head designed to cover two adjoining cylinders.

On the lower face 1 of the cylinder head corresponding to the joining plane the following are arranged opposite each cylinder.

Two bores 2 and 3 to receive the stems of inlet valves.

Two bores 4 and 5 to receive the stems of exhaust valves.

One central bore 6 to receive an injector.

The axes of the bores 2 and 3 are disposed in a plane 7 which is perpendicular both to the joining plane of the cylinder head, and to a side face 8 at which open inlet conduits 9 which extend into the interior of the head.

The axes of the bores 4 and 5 are disposed in a plane 10 which is perpendicular both to the joining plane 1 and to a side face 11 of the cylinder head at which open the exhaust conduits 12.

Each inlet conduit 9 includes a first rectilinear section 13, which is common to the two inlet valves of the cylinder. A longitudinal partition 14 whose length 15 is approximately half the total length of the inlet conduit separates the section 13 into two smaller inlet conduits 16 and 17. The conduit 16, which is very short, opens directly into a recess for the inlet valve, the stem of which is located in bore 2. The conduit 17 lies in the same plane as the conduit 16 and is curved inwardly towards the center of the cylinder (FIG. 2), as far as a recess for the inlet valve having its stem in the bore 3.

Each exhaust conduit 12 has a rectilinear section extending over a length 27 as far as a recess for the valve whose stem is located in bore 4. Thereafter, the conduit is continued by a section 18 whose shape in plan is incurved in the direction of the axis of the cylinder (FIG. 2).

Figure 5:
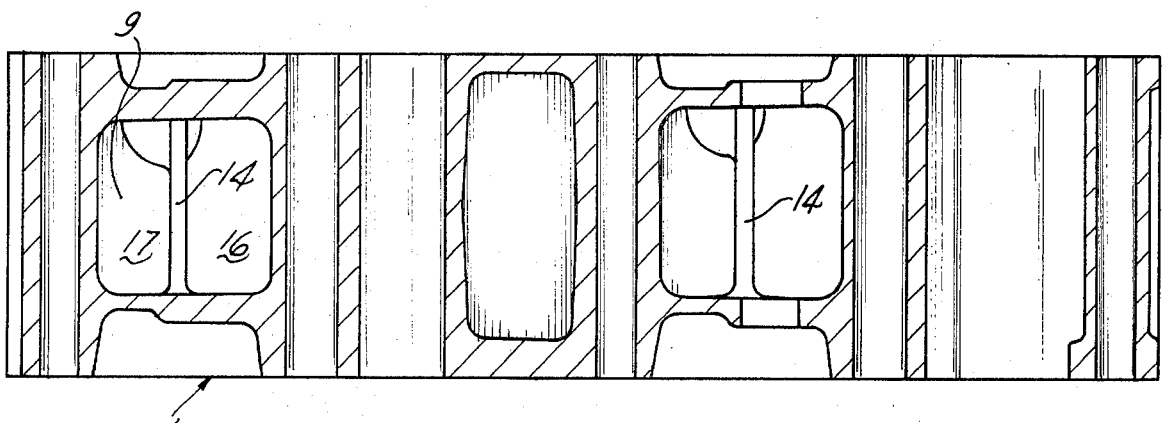
Figure 6:
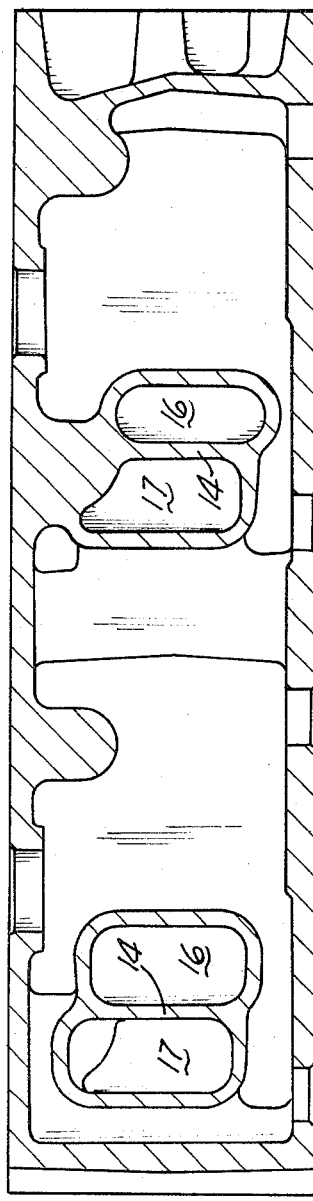

It can be seen in FIGS. 5 and 6 that each inlet conduit offers a wide initial section for the passage of air drawn into the engine and that the initial section is then divided into two small conduits 16 and 17 by the internal partition 14.

Figure 7:
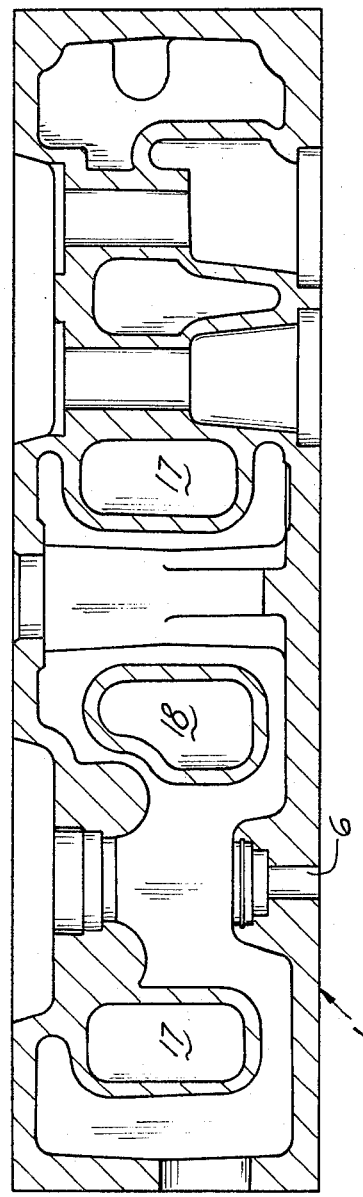

FIG. 7 shows in section the arrangement of the section 18 of the exhaust conduit in relation to the small conduit 17 from the inlet.

Figure 1:
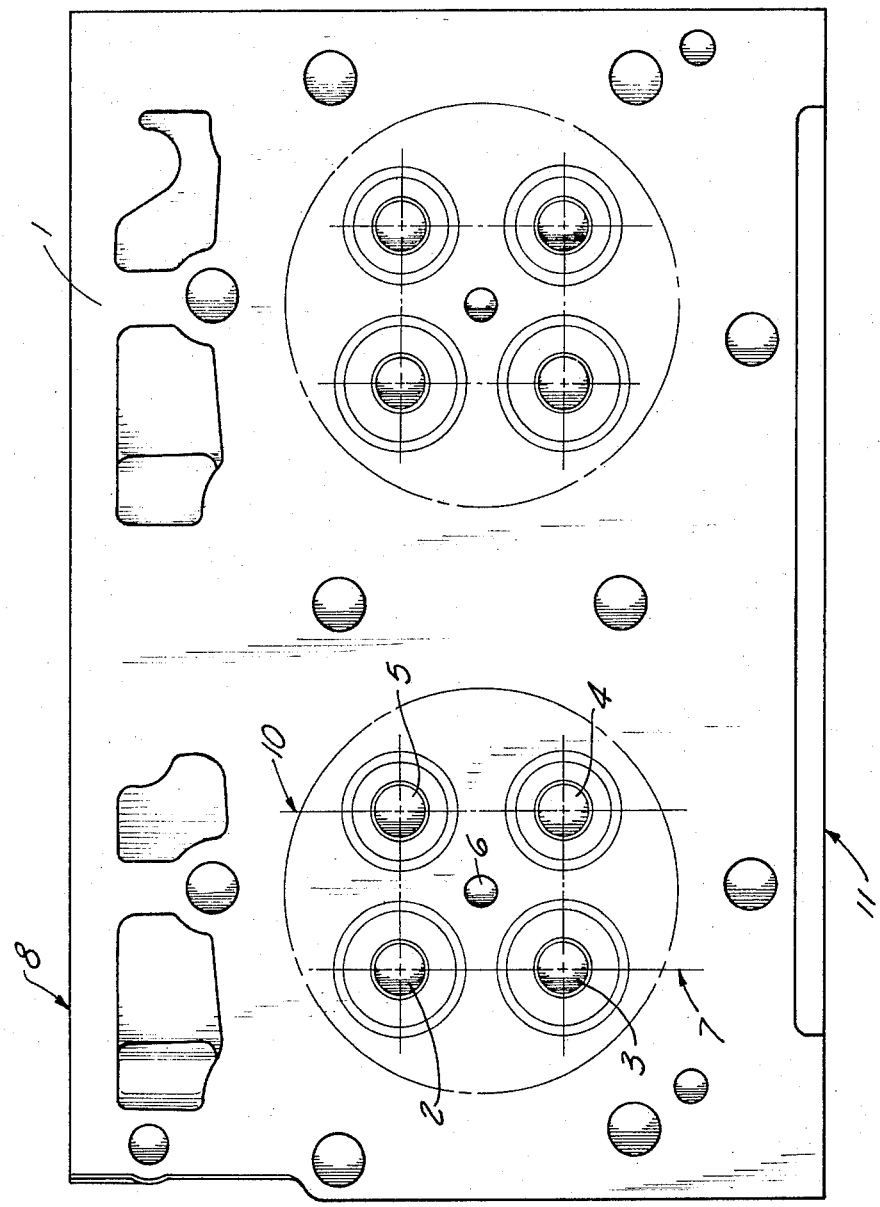
FIG. 1 is a plan view of a lower face of a cylinder head in accordance with the invention.

In the cylinder head for two cylinders, illustrated in the drawings, the arrangements of the valves and of the inlet and exhaust conduits can be inferred by simple transfer from one cylinder to the next (FIGS. 1 and 2). Consequently, the two inlet conduits 9 open on the same side face 8, whilst the two exhaust conduits 12 both open on the side face 11.

I claim:

1. In a diesel engine of the type having a plurality of cylinders wherein each cylinder has two axially spaced inlet valves and two axially spaced exhaust valves arranged about a central injector-receiving bore, the engine being provided with a cylinder head having a joining plane for two or more adjacent cylinders, and having bores to receive the stems of the inlet valves and the exhaust valves, the improvement which comprises:

a. for each of the cylinders, a common inlet conduit extending from a first side face of the cylinder head into the interior of the head and having a rectilinear configuration, a partition perpendicular to said joining plane disposed within the head and extending between the two inlet valves to divide the common inlet conduit into two smaller conduits, the two smaller conduits being co-planar with respect to each other, each of the two smaller conduits being associated with one of the inlet valves, one of the two smaller conduits extends to the inlet valve closest to the first side face of the cylinder head and opens directly into a recess for the inlet valve, the other one of the two smaller conduits extends to the inlet valve most distant from the first side face of the cylinder head and is curved inwardly toward the axis of the cylinder, b. for each of the cylinders, a common exhaust conduit opening to a second side face of the cylinder head opposite to the first side face, the exhaust conduit having a substantially rectilinear section over a length leading to a first of the two exhaust valves which is closest to the second side face and thereafter being curved inwardly towards the axis of the cylinder over a length leading to a second of the two exhaust valves, and wherein c. the axes of the two inlet valve stem bores are disposed in a plane extending perpendicular to said joining plane of the cylinder head and perpendicular to the first side face of the cylinder head, and the axes of the exhaust valve stem bores are disposed in a plane perpendicular to the second side face of the cylinder head, and the adjacent cylinder being analogously configured.

2. A cylinder head for a diesel engine as claimed in claim 1, in which the head is dimensioned to cover two cylinders of the engine, the arrangement of the valves and of the inlet and exhaust conduits being such that the two exhaust conduits open on the same said second side face of the cylinder head, and the two inlet conduits open on the first side face.

3. A cylinder head for a diesel engine as claimed in claim 1 wherein the partition length is equal to about one half the total length of the inlet conduit.

* * * * *